(12) United States Patent
Zhao et al.

(10) Patent No.: US 11,375,266 B2
(45) Date of Patent: Jun. 28, 2022

(54) SMART TELEVISION INTERACTION METHOD, STORAGE MEDIUM, AND SMART TELEVISION

(71) Applicant: SHENZHEN SKYWORTH-RGB ELECTRONIC CO., LTD., Shenzhen (CN)

(72) Inventors: Xinke Zhao, Shenzhen (CN); Jian Li, Shenzhen (CN); Wensheng Hong, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 17/257,415

(22) PCT Filed: Dec. 30, 2019

(86) PCT No.: PCT/CN2019/130079
§ 371 (c)(1),
(2) Date: Dec. 31, 2020

(87) PCT Pub. No.: WO2020/168830
PCT Pub. Date: Aug. 27, 2020

(65) Prior Publication Data
US 2021/0274243 A1 Sep. 2, 2021

(30) Foreign Application Priority Data
Feb. 21, 2019 (CN) .......................... 201910128700.1

(51) Int. Cl.
*H04N 21/43* (2011.01)
*G06F 3/14* (2006.01)
(Continued)

(52) U.S. Cl.
CPC ..... *H04N 21/43076* (2020.08); *G06F 3/1454* (2013.01); *H04L 9/0825* (2013.01);
(Continued)

(58) Field of Classification Search
CPC ......... H04N 21/43076; H04N 21/4126; H04N 21/4363; H04N 21/4367; H04N 21/4222;
(Continued)

(56) References Cited

U.S. PATENT DOCUMENTS 10,284,492 B2 * 5/2019 Gordon .................... H04L 63/10
10,827,028 B1 * 11/2020 Bromand .............. H04L 67/303
(Continued)

FOREIGN PATENT DOCUMENTS

CN 103327384 A 9/2013
CN 103593154 A 2/2014
(Continued)

OTHER PUBLICATIONS

The World Intellectual Property Organization (WIPO) International Search Report for PCT/CN2019/130079 dated Mar. 27, 2020 5 Pages (including translation).

*Primary Examiner* — John R Schnurr
(74) *Attorney, Agent, or Firm* — Anova Law Group, PLLC

(57) ABSTRACT

The disclosure discloses a smart television interaction method, a storage medium, and smart television. The method comprises: when smart television receives a screen projection request, a Bluetooth connection being established with a mobile terminal corresponding to the screen projection request according to the screen projection request and screen projection being performed; and receiving a control instruction for controlling the mobile terminal, and broadcasting the control instruction through the Bluetooth to enable the mobile terminal to execute the control instruction.
(Continued)

when a smart television receives a screen projection request, establishing a Bluetooth connection being with a mobile terminal corresponding to the screen projection request according to the screen projection request, and performing the screen projection — S10 receiving a control instruction for controlling the mobile terminal, and broadcasting the control instruction through Bluetooth to enable the mobile terminal to execute the control instruction — S20

According to the disclosure, when the smart television establishes a screen projection connection with the mobile terminal, a Bluetooth connection is established with the mobile terminal, and the control power of the mobile terminal is acquired through the Bluetooth so as to control the mobile terminal so that the dependence on the mobile terminal is avoided and the trouble of using the mobile terminal for a long time is solved.

15 Claims, 2 Drawing Sheets

(51) Int. Cl.
| | | |
|---|---|---|
| | *H04L 9/08* | (2006.01) |
| | *H04L 9/32* | (2006.01) |
| | *H04N 21/41* | (2011.01) |
| | *H04N 21/4363* | (2011.01) |
| | *H04N 21/4367* | (2011.01) |

(52) U.S. Cl.
CPC ....... *H04L 9/3228* (2013.01); *H04N 21/4126* (2013.01); *H04N 21/4363* (2013.01); *H04N 21/4367* (2013.01)

(58) Field of Classification Search
CPC ....... H04N 21/42684; H04N 21/43637; H04N 21/41407; G06F 3/1454; H04L 9/0825; H04L 9/3228; H04W 84/18; H04W 4/023; H04W 4/80; G08C 17/02
See application file for complete search history.

(56) References Cited

U.S. PATENT DOCUMENTS

| | | | |
|---|---|---|---|
| 2007/0242233 | A1 | 10/2007 | Sokeila et al. |
| 2011/0107388 | A1* | 5/2011 | Lee .................... H04N 7/17318 |
| | | | 725/118 |
| 2014/0184725 | A1 | 7/2014 | Wu et al. |
| 2015/0356949 | A1* | 12/2015 | Kim ........................ G06F 3/013 |
| | | | 345/173 |
| 2016/0323863 | A1 | 11/2016 | Park et al. |
| 2017/0150227 | A1 | 5/2017 | Kim et al. |
| 2017/0220311 | A1* | 8/2017 | Oh ........................ H04L 65/601 |
| 2018/0077442 | A1* | 3/2018 | Herz ................ H04N 21/43078 |
| 2018/0196596 | A1 | 7/2018 | Choi et al. |
| 2018/0288677 | A1 | 10/2018 | Jain et al. |
| 2019/0089925 | A1* | 3/2019 | Lee ......................... H04N 5/642 |
| 2019/0230408 | A1 | 7/2019 | Borghei .................. H04L 67/02 |
| 2019/0320219 | A1* | 10/2019 | Yoden ................... G06F 3/0486 |
| 2020/0260396 | A1* | 8/2020 | Keyser-Allen ... H04N 21/43076 |
| 2021/0117146 | A1* | 4/2021 | Choi ....................... H04L 67/10 |
| 2021/0168439 | A1* | 6/2021 | Jin ........................ G06F 3/1454 |
| 2021/0182013 | A1* | 6/2021 | Guo ........................ G06F 3/147 |

FOREIGN PATENT DOCUMENTS

| | | |
|---|---|---|
| CN | 106502604 A | 3/2017 |
| CN | 107483994 A | 12/2017 |
| CN | 107659712 A | 2/2018 |
| CN | 109168038 A | 1/2019 |
| CN | 109862404 A | 6/2019 |
| WO | 2017018737 A1 | 2/2017 |

\* cited by examiner

SMART TELEVISION INTERACTION METHOD, STORAGE MEDIUM, AND SMART TELEVISION

CROSS-REFERENCES TO RELATED APPLICATIONS

This application is a national stage application of PCT Patent Application No. PCT/CN2019/130079, filed on Dec. 30, 2019, which claims priority to Chinese Patent Application No. 201910128700.1, filed on Feb. 21, 2019, the content of all of which is incorporated herein by reference.

FIELD OF THE APPLICATION

The disclosure relates to the technical field of smart television, in particular to a smart television interaction method, a storage medium, and smart television.

BACKGROUND

At present, the projection connection between smart television and a terminal is a one-way operation, that is, the content of a terminal screen is projected to the smart television through a WIFI network protocol so that the smart television displays the content of the terminal screen. However, after the smart television is connected with the terminal screen projection, the smart television can only provide the content in the terminal, and the APP in the operation terminal cannot be operated through the smart television so that when a user watches multimedia resources through the screen projection, the user needs to use the terminal to operate, and inconvenience is brought to the user.

BRIEF SUMMARY OF THE DISCLOSURE

The technical problem to be solved by the present disclosure is to provide a smart television interaction method, a storage medium, and a smart television aiming at the defects of the prior art.

The technical solution adopted by the present disclosure is as follows:

a smart television interaction method comprises:

when smart television receives a screen projection request, a Bluetooth connection being established with a mobile terminal corresponding to the screen projection request according to the screen projection request, and screen projection being performed; and a control instruction for controlling the mobile terminal being received, and the control instruction being broadcasted through Bluetooth to enable the mobile terminal to execute the control instruction.

Further, in one embodiment, when the smart television receives the screen projection request, a Bluetooth connection is established with the mobile terminal corresponding to the screen projection request according to the screen projection request, and screen projection is performed, specifically comprising:

when the smart television receives a screen projection request, the smart television searches a connectable terminal, and searching a corresponding mobile terminal in the searched terminal according to the screen projection request; and when a mobile terminal corresponding to the screen projection request is searched, establishing a Bluetooth connection with the mobile terminal and performing screen projection.

Further, in one embodiment, the screen projection request is a screen projection request sent to the smart television by the mobile terminal in a wireless manner, wherein the mobile terminal and the smart television are in the same local area network.

Further, in one embodiment, when a mobile terminal corresponding to a screen projection request is searched, a Bluetooth connection is established with the mobile terminal, and screen projection is performed, specifically comprising:

when a mobile terminal corresponding to the screen projection request is found, establishing a connection with the mobile terminal and acquiring a distance between the smart television and the mobile terminal through Bluetooth;

comparing the distance with a preset distance threshold; and when the distance is smaller than a preset distance threshold, executing the screen projection request and carrying out screen projection through wifi.

Further, in one embodiment, when the smart television receives a screen projection request carrying equipment identification of the mobile terminal, the smart television searches a connectable terminal, wherein searching a corresponding mobile terminal in the searched terminal according to the screen projection request specifically comprises:

when the smart television receives the screen projection request, the smart television searches a connectable terminal to form a terminal equipment list; and the mobile terminal corresponding to the screen projection request being searched in the terminal equipment list according to the equipment identification.

Further, in one embodiment, when the distance is smaller than the preset distance threshold, executing the screen projection request and performing screen projection through wifi specifically comprise:

when the distance is smaller than the preset distance threshold, the smart television acquiring an equipment address thereof; and transmitting the equipment address to the mobile terminal through the Bluetooth so as to establish screen projection pairing with the mobile terminal and perform screen projection.

Further, in one embodiment, when a mobile terminal corresponding to the screen projection request is found, establishing a connection with the mobile terminal and acquiring a distance between the smart television and the mobile terminal through Bluetooth specifically comprise:

when a mobile terminal corresponding to the screen projection request is found, establishing a connection with the mobile terminal; and calling an RSSI value through an RSSI interface function configured by the smart television, and the distance between the smart television and the mobile terminal being calculated according to the called RSSI value.

Further, in one embodiment, when the smart television receives the screen projection request, a Bluetooth connection is established with the mobile terminal corresponding to the screen projection request according to the screen projection request, and screen projection is performed, specifically comprising:

when the smart television receives a screen projection request, a Bluetooth connection being established with the mobile terminal corresponding to the screen projection request according to the screen projection request;

the smart television carrying out public key interaction with the mobile terminal by adopting an elliptic curve symmetric encryption mode, and generating a shared key according to the public key and a private key stored by the smart television;

carrying out security authentication on the mobile terminal by adopting the shared key; and when the security authentication is successful, establishing a screen projection connection with the mobile terminal and performing screen projection.

Further, in one embodiment, when a security verification is successful, the smart television establishes a screen projection connection with the mobile terminal and performs screen projection, specifically comprising:

when the security authentication is successful, generating a Link Key according to the shared key; and establishing the screen projection connection with the mobile terminal through the Link Key, and receiving the screen projection of the mobile terminal to display multimedia resources played by the mobile terminal.

Further, in one embodiment, the smart television establishes a conversation connection with the mobile terminal; receiving the screen projection of the mobile terminal to display multimedia resources played by the mobile terminal specifically comprises:

receiving code stream data transmitted by the mobile terminal through the conversation connection, wherein the code stream data comprises multimedia resources played by the mobile terminal; and decoding the code stream data, and displaying received multimedia resources played by the mobile terminal.

Further, in one embodiment, before the step that when the smart television receives the screen projection request, a Bluetooth connection is established with the mobile terminal corresponding to the screen projection request according to the screen projection request and screen projection is performed, the following steps are carried out, comprising:

when the smart television is turned on, Bluetooth signal scanning being carried out once every preset time interval, and the Bluetooth being turned on when Bluetooth information is scanned.

Further, in one embodiment, a control instruction for controlling the mobile terminal being received, and the control instruction being broadcasted through Bluetooth to enable the mobile terminal to execute the control instruction specifically comprise:

receiving a control instruction for controlling the mobile terminal, and generating Bluetooth broadcast according to the control; and transmitting the Bluetooth broadcast to the mobile terminal through the Bluetooth, and acquiring the control power of the mobile terminal so as to control the mobile terminal to execute the control instruction through the control power.

Further, in one embodiment, the control instruction is a control instruction generated according to a voice message.

A computer-readable storage medium, wherein the computer-readable storage medium stores one or more programs that can be executed by one or more processors to implement the steps in the smart television interaction method as claimed in any one.

A smart television, comprising: a processor, a memory, and a bus; a computer-readable program executable by the processor is stored on the memory;

the bus realizes connection communication between the processor and the memory;

the processor, when executing the computer-readable program, realizes the steps in the smart television interaction method as claimed in any one.

Beneficial effects: compared with the prior art, the disclosure provides a smart television interaction method, a storage medium, and a smart television; the method comprises: when smart television receives a screen projection request, a Bluetooth connection being established with a mobile terminal corresponding to the screen projection request according to the screen projection request and screen projection being performed; and receiving a control instruction for controlling the mobile terminal, and broadcasting the control instruction through the Bluetooth to enable the mobile terminal to execute the control instruction. According to the disclosure, when the smart television establishes a screen projection connection with the mobile terminal, a Bluetooth connection is established with the mobile terminal, and the control power of the mobile terminal is acquired through the Bluetooth so as to control the mobile terminal, so that the mobile terminal can be controlled through the smart television in the screen projection process, the dependence on the mobile terminal is avoided and convenience is brought to users during use.

DETAILED DESCRIPTION

The disclosure provides a smart television interaction method, a storage medium, and a smart television. In order to make the objects, technical solutions, and effects of the present disclosure clearer and more explicit, the present disclosure will be further described in detail below with reference to the accompanying drawings and embodiments. It is to be understood that the specific embodiments described herein are merely illustrative of the present disclosure and are not intended to be limiting thereof.

It will be understood by those skilled in the art that, as used herein, the singular forms "a", "one", "the" and "said" may include the plural forms as well, unless expressly stated otherwise. It should be further understood that the word "comprises/comprising" when used in this description of the disclosure is taken to specify the presence of stated features, integers, steps, operations, elements, and/or assemblies, but does not preclude the presence or addition of one or more other features, integers, steps, operations, elements, assemblies, and/or groups thereof. It will be understood that when an element is referred to as being "connected" or "coupled" to another element, it can be directly connected or coupled to other elements or intervening elements may also be present. Furthermore, "connected" or "coupled" as used herein may include wirelessly connected or wirelessly coupled. As used herein, the phrase "and/or" includes all or any unit and all combinations of one or more of the associated listed items.

It will be understood by those skilled in the art that, unless otherwise defined, all terms (including technical and scientific terms) used herein have the same meaning as commonly understood by one of ordinary skills in the art to which this disclosure belongs. It should also be understood that terms, such as those defined in commonly used dictionaries, should be interpreted as having a meaning that is consistent with the meaning in the context of the prior art and will not be interpreted in an idealized or overly formal sense unless expressly so defined herein.

The disclosure is further illustrated by the following description of embodiments, taken in conjunction with the accompanying drawings.

Figure 1:
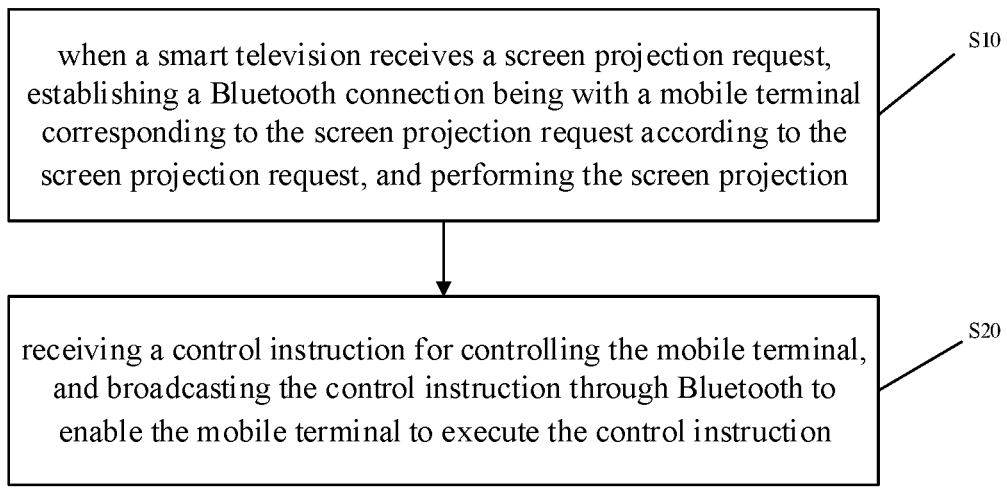
FIG. 1 is a flow diagram of one embodiment of a smart television interaction method provided by the present disclosure.

The embodiment provides an interaction method of smart television. The method may be executed by an interaction device, and the interaction device may be implemented by software and applied to the smart television. Referring to FIG. 1, the interaction method of smart television provided by the embodiment specifically comprises the following steps.

S10, when a smart television receives a screen projection request, a Bluetooth connection is established with the mobile terminal corresponding to the screen projection request according to the screen projection request, and screen projection is performed.

Figure 2:
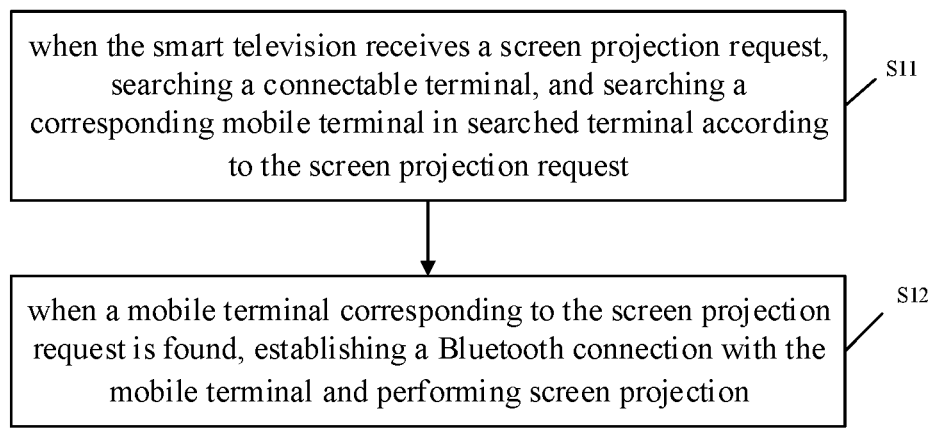
FIG. 2 is a flow diagram of step S10 in one embodiment of a smart television interaction method provided by the present disclosure.

Specifically, the screen projection request is generated by the mobile terminal, and the mobile terminal may send the screen projection request to a local area network where the mobile terminal is located in a wireless broadcast mode so that other terminal equipment in the local area network may receive the screen projection request. That is, the smart television is within the same local area network as the mobile terminal. In addition, after receiving the screen projection request, the smart television searches all the Bluetooth equipment which may be connected through the Bluetooth configured by the smart television so as to establish a connection with the mobile terminal corresponding to the screen projection request, wherein the mobile terminal corresponding to the screen projection request is configured with Bluetooth function. Correspondingly, as shown in FIG. 2, when the smart television receives the screen projection request, a Bluetooth connection is established with the mobile terminal corresponding to the screen projection request according to the screen projection request, and screen projection is performed, specifically comprising:

S11, when the smart television receives a screen projection request, the smart television searches a connectable terminal, and searching a corresponding mobile terminal in the searched terminal according to the screen projection request; and S12, when a mobile terminal corresponding to the screen projection request is found, establishing a Bluetooth connection with the mobile terminal and performing screen projection.

Specifically, the screen projection request carries an equipment identification of the mobile terminal so as to determine the mobile terminal corresponding to the screen projection request according to the equipment identification. That is, the smart television searches all terminal equipment within the Bluetooth search range through the Bluetooth device configured by the smart television, and generates a terminal equipment list according to the searched terminals. The mobile terminal corresponding to the screen projection request is searched in the terminal equipment list according to the equipment identification. In addition, the Bluetooth function of the smart television may be turned on according to the screen projection request when the screen projection request is received, that is, when the screen projection request is received, the Bluetooth function configured by the smart television may be turned on according to the screen projection request. Of course, the Bluetooth function of the smart television may be turned on according to the Bluetooth signal it receives. That is to say, before the step that when the smart television receives the screen projection request, a Bluetooth connection is established with the mobile terminal corresponding to the screen projection request according to the screen projection request and screen projection is performed, the following steps are carried out, comprising: when the smart television is turned on, Bluetooth signal scanning being carried out once every preset time interval, and the Bluetooth being turned on when Bluetooth information is scanned. Wherein the preset time is preset, for example, 1 second and the like.

Further, in one embodiment of the present disclosure, when a mobile terminal corresponding to a screen projection request is searched, a Bluetooth connection is established with the mobile terminal and screen projection is performed, specifically comprising:

S111, when a mobile terminal corresponding to the screen projection request is found, establishing a connection with the mobile terminal and acquiring the distance between the smart television and the mobile terminal through Bluetooth;

S112, comparing the distance with a preset distance threshold; and

S113, when the distance is smaller than a preset distance threshold, executing the screen projection request and carrying out screen projection through wifi.

Specifically, in step S111, the smart television calls an RSSI value through an RSSI interface function configured by the smart television, and the distance between the smart television and the mobile terminal is calculated according to the called RSSI value. Wherein the formula for calculating the distance according to the RSST value can be as follows:

$$d=10^{((abs(RSSI)-A)/(10*n))}$$

Wherein, d is the calculated distance, RSSI is the received signal strength (negative value), A is the signal strength when the transmitting end and the receiving end are separated by 1 meter, and n is the environmental attenuation factor. In practical application, the implementation code of the calculation formula can be as follows:

```
(float)calcDistByRSSI:(int)rssi
{
int iRssi = abs(rssi);
float power = (iRssi−59)/(10*2.0);
return pow(10, power);
}
```

In addition, each parameter of the calculation formula may be preset, and in this embodiment, A parameter is preferably 55, and n is preferably 2.0. Of course, since the environments are different, the corresponding parameter values of each transmitting source (Bluetooth equipment) are different, and the parameters may adopt different values according to the use environments, which will not be explained here.

Furthermore, in step S112, the preset distance threshold is a preset distance used for verifying the safety of the mobile terminal. Because when the smart television and the mobile terminal are in the same local area network, the mobile terminal may turn on screen projection, and as the smart television passively receives and displays, especially in a commercial environment where a WIFI channel is easily intercepted by an abnormal user, unsafe or unhealthy content is caused to be displayed on the smart television. Therefore, in the embodiment, the distance between the smart television and the mobile terminal is verified by adopting a preset distance threshold so as to authenticate the safety of screen projection. That is to say, when the distance between the smart television and the mobile terminal is smaller than the preset distance threshold, it is stated that the user is within the normal watching range of the television so as to judge that the screen projection request of the mobile terminal is safe, and when the distance between the smart television and the mobile terminal is greater than or equal to the preset distance, it is stated that the user is not within the normal watching range of the television so as to judge that the screen projection request of the mobile terminal is not safe and the screen projection request is discarded. Therefore, the mobile terminal may be guaranteed to be within a preset distance range, and the possibility of being attacked remotely is avoided.

Further, in step S113, in order to improve the screen projection connection speed of the smart television and the mobile terminal, after the screen projection request is verified through the distance, the equipment address of the smart television may be obtained through the Bluetooth, and the connection with the smart television may be quickly established according to the equipment address. Correspondingly, when the distance is smaller than the preset distance threshold, executing the screen projection request and performing screen projection through wifi specifically comprise:

when the distance is smaller than a preset distance threshold, the smart television acquiring the equipment address thereof; and transmitting the equipment address to the mobile terminal through the Bluetooth so as to establish screen projection pairing with the mobile terminal and perform screen projection.

Specifically, the equipment address is a unique identification of the smart television such that the smart television may be quickly determined according to the equipment address, the time for establishing a connection may be effectively shortened, and the link of manually establishing a connection is saved.

Further, in one embodiment of the present disclosure, security verification may also be performed by a key prior to establishing the screen projection connection, either prior to distance verification or after distance verification. In the embodiment, the key verification is carried out after the distance verification, that is, secondary verification is carried out on the screen projection request so that the security of the screen projection request is improved. Correspondingly, when the smart television receives the screen projection request, a Bluetooth connection is established with the mobile terminal corresponding to the screen projection request according to the screen projection request, and screen projection is performed, specifically comprising:

when the smart television receives a screen projection request, the smart television establishing a Bluetooth connection with the mobile terminal corresponding to the screen projection request according to the screen projection request;

the smart television carrying out public key interaction with the mobile terminal by adopting an elliptic curve symmetric encryption mode, and generating a shared key according to the public key and a private key stored by the smart television; and carrying out security authentication on the mobile terminal by adopting the shared key, and establishing a screen projection connection with the mobile terminal and carrying out screen projection when the security authentication is successful.

Specifically, adopting an elliptic curve asymmetric encryption mode refers that the smart television and the mobile terminal exchange a public key and respectively reserve a private key, calculate a shared key according to the public key and the private key, carry out an authentication through the shared key, and generate a Link Key through the shared key after the final authentication is passed. Therefore, the generation of the key in the authentication encryption process has randomness and users may not directly contact the key such that the safety coefficient of the key is greatly improved and the encryption degree of the elliptic curve asymmetric encryption algorithm is very high. In addition, after the connection key is generated, the screen projection connection is established according to the Link Key. That is to say, when the security verification is successful, the smart television establishes the screen projection connection with the mobile terminal and performs screen projection, specifically comprising: when the security authentication is successful, generating a Link Key according to the shared key; and establishing the screen projection connection with the mobile terminal through the Link Key, and receiving the screen projection of the mobile terminal to display multimedia resources played by the mobile terminal.

Further, the connection between the mobile terminal and the smart television is established through Wi-Fi P2P, that is, according to the Wi-Fi Direct technical specification, the mobile terminal and the smart television will establish one TCP connection while one port for RTSP protocol will be created for subsequent Session management and control work. After the connection is established, the mobile terminal and the smart television negotiate a communication protocol. That is, before the video and audio data are formally transmitted, the mobile terminal and the smart television need to exchange some parameter information about the connection, such as the video and audio formats supported by the two parties, and the like. In addition, after the negotiation of the communication protocol is completed, the mobile terminal and the smart television will establish one conversation connection. Then, the transmission of video and audio data is then commenced through the conversation connection. Wherein, the video and audio data and the UI interaction layer data of the mobile terminal are encoded into the H.264 code stream through the MPEG2 TS and then transmitted to the smart television through the RTP protocol, and the smart television decodes the received data of the H.264 and finally displays it, so that the video and audio data and the UI layer data are packaged and encoded for transmission, displayable content is added, and the application scene of screen projection is enriched.

S20, a control instruction for controlling the mobile terminal is received, and the control instruction is broadcasted through Bluetooth to enable the mobile terminal to execute the control instruction.

Specifically, the control instruction is received by the smart television, that is, the control instruction is received by the smart television when the smart television is in a screen projection state. When the smart television is in a screen projection state, the control instruction is received. The smart television sets the control instruction as a control instruction where a screen projection request corresponds to the mobile terminal, and generates Bluetooth broadcast according to the control instruction to transmit the Bluetooth broadcast to the mobile terminal through the Bluetooth, so that the mobile terminal executes the control instruction.

Figure 3:
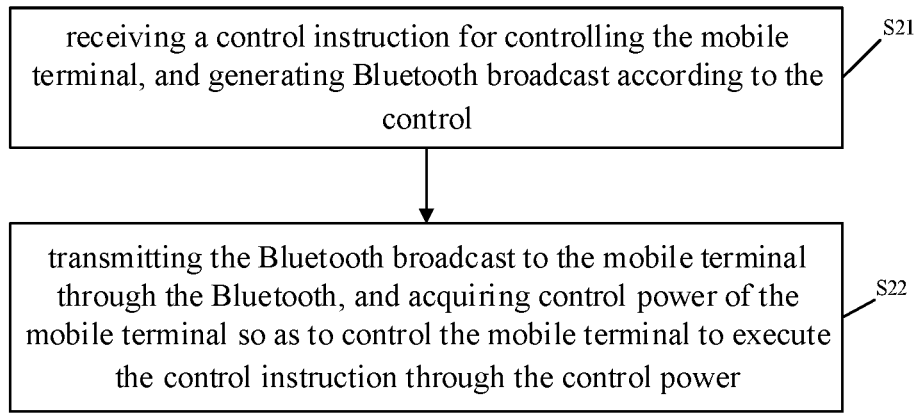
FIG. 3 is a flow diagram of step S20 in one embodiment of a smart television interaction method provided by the present disclosure.

Illustratively, as shown in FIG. 3, receiving the control instruction for controlling the mobile terminal, and broadcasting the control instruction through the Bluetooth to enable the mobile terminal to execute the control instruction specifically comprise:

S21, receiving a control instruction for controlling the mobile terminal, and generating Bluetooth broadcast according to the control; and S22, transmitting the Bluetooth broadcast to the mobile terminal through the Bluetooth, and acquiring the control power of the mobile terminal so as to control the mobile terminal to execute the control instruction through the control power.

Specifically, the control instruction may be generated according to a voice message or may be generated according to a remote-control instruction. Here, the control instruction generated according to a voice message is taken as an example, wherein the smart television is smart television having a voice input function. The smart television may acquire a control instruction in a voice form through a remote controller or a far-field voice array microphone built in the smart television, pack the control instruction into voice data for Bluetooth transmission, and transmit the voice data by calling BluetoothA2DP protocol of the Bluetooth so as to enable the mobile terminal to receive the voice data transmitted by the Bluetooth and analyze the voice data to obtain the control instruction.

Further, since the control of the source terminal needs to be realized by voice command, the operating authorization of the source terminal system must be obtained first, but the root authorization may not be obtained at the APK layer. The Service started by init helps an application execute the command of the root authorization or realizes virtual equipment, which helps the application execute the command of the root authorization. That is, when the mobile terminal is turned on, the init process creates one daemon under root user privilege that is used to monitor requests from applications in the system (implemented with socket) and complete the requests on behalf of them. This allows the application to execute root user privilege task. The Service is defined in the system init.rc, and the Service defined in Init.rc is created by the Init process so that root privilege may be acquired. Setting the system attribute "ctl.start", and setting "ctl.start" to the Service you want to run, assuming as "xxx", the Android system will help you run the Service specified in the "ctl.start" system attribute. The running result init process is then written to the system attribute named "init.svc.+xxx" and the application may refer to this value to determine the execution of Service xxx. In addition, the system of the mobile terminal creates one user and group for each application (apk), each user and group is a limited user, the data of the system may not be accessed, and only files and directories of the user and the group may be accessed, so that private data of the application may be protected, and security and robustness of the system are enhanced.

Based on the smart television interaction method described above, the present disclosure also provides a computer-readable storage medium characterized by storing one or more programs that may be executed by one or more processors to implement the steps in the smart television interaction method described in the above embodiments.

Figure 4:
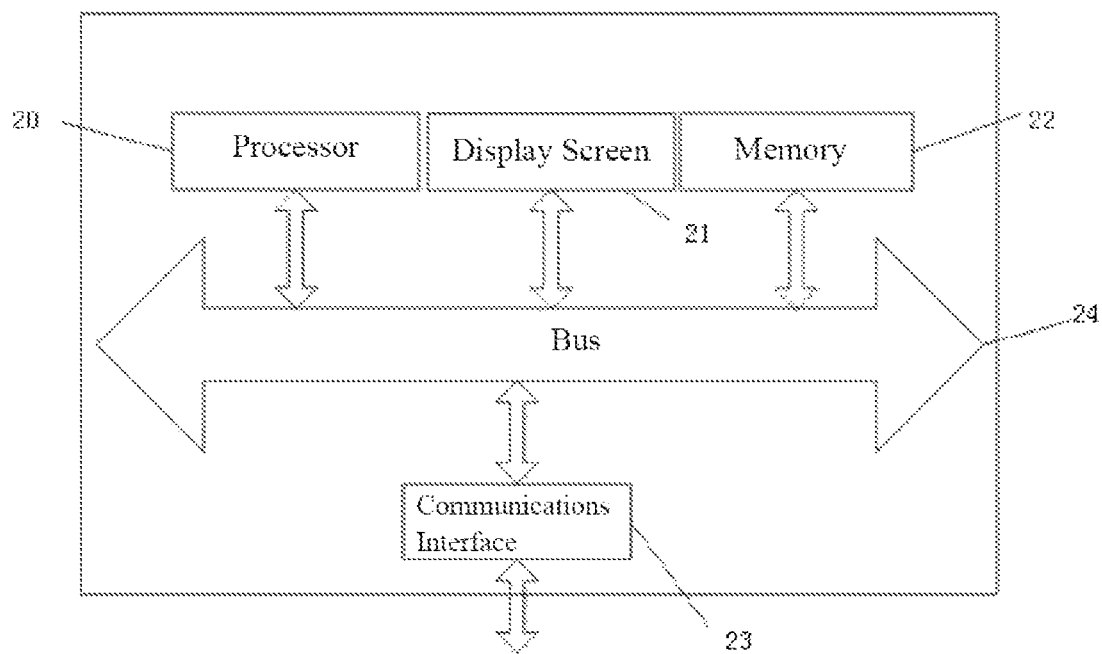
FIG. 4 is a schematic structural diagram of one embodiment of smart television provided by the present disclosure.

Based on the interaction method of the smart television described above, the disclosure also provides smart television which comprises at least one processor 20 as shown in FIG. 4; a display screen 21; and a memory 22, and may also comprise a Communications Interface 23 and a bus 24. Among other things, the processor 20, the display screen 21, the memory 22 and the Communications Interface 23 may communicate with each other via the bus 24. The display screen 21 is set to display a user guide interface preset in the initial setting mode. The Communications Interface 23 may transmit information. The processor 20 may call a logical instruction in the memory 22 to execute the method in the embodiment described above.

Furthermore, the logic instruction in the memory 22 described above may be implemented in the form of a software functional unit and stored in one computer-readable storage medium when sold or used as a stand-alone product.

The memory 22, as a computer-readable storage medium, may be set to store software programs, computer-executable programs, program instructions or modules corresponding to the methods in the disclosed embodiments. The processor 20 executes functional applications and data processing, i.e. implements the methods in the embodiments described above, by running software programs, instructions or modules stored in the memory 22.

The memory 22 may comprise a storage program area and a storage data area, wherein the storage program area may store an operating system and application programs required by at least one function; the storage data area may store data or the like created according to the use of the mobile terminal. In addition, the memory 22 may comprise high-speed random access memory, and may also comprise non-volatile memory. For example, a U disk, a mobile hard disk, a Read-Only Memory (ROM), a Random Access Memory (RAM), a magnetic disk, or an optical disk and like media that may store program code may also be a transient storage medium.

Furthermore, the particular process of a processor loading and executing a plurality of instructions stored in the storage medium and the mobile terminal has been described in detail in the above method and will not be set forth herein.

Finally, it should be noted that: the above embodiments are merely illustrative of the technical solutions of the present disclosure and are not intended to be limiting thereof; although the present disclosure has been described in detail with reference to the foregoing embodiments, those skilled in the art will appreciate that: the technical solutions of the above-mentioned embodiments can still be modified, or some of the technical features thereof can be equivalently replaced; such modifications or substitutions do not depart the nature of the corresponding technical solutions from the spirit and scope of the various embodiments and technical solutions of this disclosure.

What is claimed is:

1. A smart television interaction method, comprising:
when a smart television receives a screen projection request, establishing a Bluetooth connection being with a mobile terminal corresponding to the screen projection request according to the screen projection request, and performing the screen projection; and
receiving a control instruction for controlling the mobile terminal, and broadcasting the control instruction through Bluetooth to enable the mobile terminal to execute the control instruction,
wherein, when the smart television receives a screen projection request, establishing a Bluetooth connection with a mobile terminal corresponding to the screen projection request according to the screen projection request, and performing the screen projection, comprising:
when the smart television receives a screen projection request, searching a connectable terminal, and searching a corresponding mobile terminal in searched terminal according to the screen projection request, and when a mobile terminal corresponding to the screen projection request is found, establishing a Bluetooth connection with the mobile terminal and performing screen projection.

2. The smart television interaction method according to claim 1, wherein, the screen projection request is a screen projection request sent to the smart television by the mobile terminal in a wireless manner, the mobile terminal and the smart television are in the same local area network.

3. The smart television interaction method according to claim 1, wherein, the when the smart television receives a screen projection request carrying equipment identification of the mobile terminal, searching a connectable terminal, and searching a corresponding mobile terminal in the searched terminal according to the screen projection request comprising:

when the smart television receives the screen projection request, searching a connectable terminal to form a terminal equipment list; and searching the mobile terminal corresponding to the screen projection request in the terminal equipment list according to the equipment identification.

4. The smart television interaction method according to claim 1, wherein, the when a mobile terminal corresponding to a screen projection request is searched, establishing a Bluetooth connection with the mobile terminal and performing screen projection, comprising:

when a mobile terminal corresponding to the screen projection request is found, establishing a connection with the mobile terminal and acquiring a distance between the smart television and the mobile terminal through Bluetooth;

comparing the distance with a preset distance threshold; and when the distance is smaller than a preset distance threshold, executing the screen projection request and carrying out screen projection through wifi.

5. The smart television interaction method according to claim 4, wherein, the when the distance is smaller than the preset distance threshold, executing the screen projection request and performing screen projection through wifi comprising:

when the distance is smaller than the preset distance threshold, the smart television acquiring an equipment address thereof; and transmitting the equipment address to the mobile terminal through the Bluetooth so as to establish screen projection pairing with the mobile terminal and perform screen projection.

6. The smart television interaction method according to claim 4, wherein, the when a mobile terminal corresponding to a screen projection request is found, establishing a connection with the mobile terminal, and acquiring the distance between the smart television and the mobile terminal through the Bluetooth, comprising:

when a mobile terminal corresponding to the screen projection request is found, establishing a connection with the mobile terminal; and calling an RSSI value through an RSSI interface function configured by the smart television, and calculating the distance between the smart television and the mobile terminal according to the called RSSI value.

7. The smart television interaction method according to claim 1, wherein, the when the smart television receives a screen projection request, establishing a Bluetooth connection with a mobile terminal corresponding to the screen projection request according to the screen projection request and performing screen projection, comprising:

when the smart television receives a screen projection request, establishing a Bluetooth connection with the mobile terminal corresponding to the screen projection request according to the screen projection request;

the smart television carrying out public key interaction with the mobile terminal by adopting an elliptic curve symmetric encryption mode, and generating a shared key according to the public key and a private key stored by the smart television;

carrying out security authentication on the mobile terminal by adopting the shared key; and when the security authentication is successful, establishing a screen projection connection with the mobile terminal and performing screen projection.

8. The smart television interaction method according to claim 7, wherein, the when a security verification is successful, the smart television establishes a screen projection connection with the mobile terminal and performs screen projection, comprising:

when the security authentication is successful, generating a Link Key according to the shared key; and establishing the screen projection connection with the mobile terminal through the Link Key, and receiving the screen projection of the mobile terminal to display multimedia resources played by the mobile terminal.

9. The smart television interaction method according to claim 8, wherein, the smart television establishes a conversation connection with the mobile terminal; receiving the screen projection of the mobile terminal to display multimedia resources played by the mobile terminal comprising:

receiving code stream data transmitted by the mobile terminal through the conversation connection, wherein the code stream data comprises multimedia resources played by the mobile terminal; and decoding the code stream data, and displaying received multimedia resources played by the mobile terminal.

10. The smart television interaction method according to claim 1, before the smart television receives the screen projection request, establishing a Bluetooth connection with a mobile terminal corresponding to the screen projection request according to the screen projection request and performing screen projection, the method further comprising:

when the smart television is turned on, Bluetooth signal scanning being carried out once every preset time interval, and the Bluetooth being turned on when Bluetooth information is scanned.

11. The smart television interaction method according to claim 1, wherein, the receiving a control instruction for controlling the mobile terminal and broadcasting the control instruction through Bluetooth to enable the mobile terminal to execute the control instruction comprising:

receiving a control instruction for controlling the mobile terminal, and generating Bluetooth broadcast according to the control; and transmitting the Bluetooth broadcast to the mobile terminal through the Bluetooth, and acquiring control power of the mobile terminal so as to control the mobile terminal to execute the control instruction through the control power.

12. The smart television interaction method according to claim 11, wherein, the control instruction is a control instruction generated according to voice information.

13. The smart television interaction method according to claim 1, wherein, the control instruction is a control instruction generated according to voice information.

14. A non-transitory computer-readable storage medium, wherein the computer-readable storage medium stores one or more programs that can be executed by one or more processors to implement:
- when a smart television receives a screen projection request, establishing a Bluetooth connection being with a mobile terminal corresponding to the screen projection request according to the screen projection request, and performing the screen projection; and
- receiving a control instruction for controlling the mobile terminal, and broadcasting the control instruction through Bluetooth to enable the mobile terminal to execute the control instruction,
- wherein, when the smart television receives a screen projection request, establishing a Bluetooth connection with a mobile terminal corresponding to the screen projection request according to the screen projection request, and performing the screen projection, comprising:
- when the smart television receives a screen projection request, searching a connectable terminal, and searching a corresponding mobile terminal in searched terminal according to the screen projection request, and
- when a mobile terminal corresponding to the screen projection request is found, establishing a Bluetooth connection with the mobile terminal and performing screen projection.

15. A smart television, comprising: a processor, a memory and a bus; a computer-readable program executable by the processor is stored on the memory;
- the bus realizes connection communication between the processor and the memory;
- the processor, when executing the computer-readable program, is configured to perform:
- when a smart television receives a screen projection request, establishing a Bluetooth connection being with a mobile terminal corresponding to the screen projection request according to the screen projection request, and performing the screen projection; and
- receiving a control instruction for controlling the mobile terminal, and broadcasting the control instruction through Bluetooth to enable the mobile terminal to execute the control instruction,
- wherein, when the smart television receives a screen projection request, establishing a Bluetooth connection with a mobile terminal corresponding to the screen projection request according to the screen projection request, and performing the screen projection, comprising:
- when the smart television receives a screen projection request, searching a connectable terminal, and searching a corresponding mobile terminal in searched terminal according to the screen projection request, and
- when a mobile terminal corresponding to the screen projection request is found, establishing a Bluetooth connection with the mobile terminal and performing screen projection.

\* \* \* \* \*